April 30, 1935. A. C. KLECKNER ET AL 1,999,697
PRESSURE RESPONSIVE VALVE
Filed April 11, 1933 2 Sheets-Sheet 1
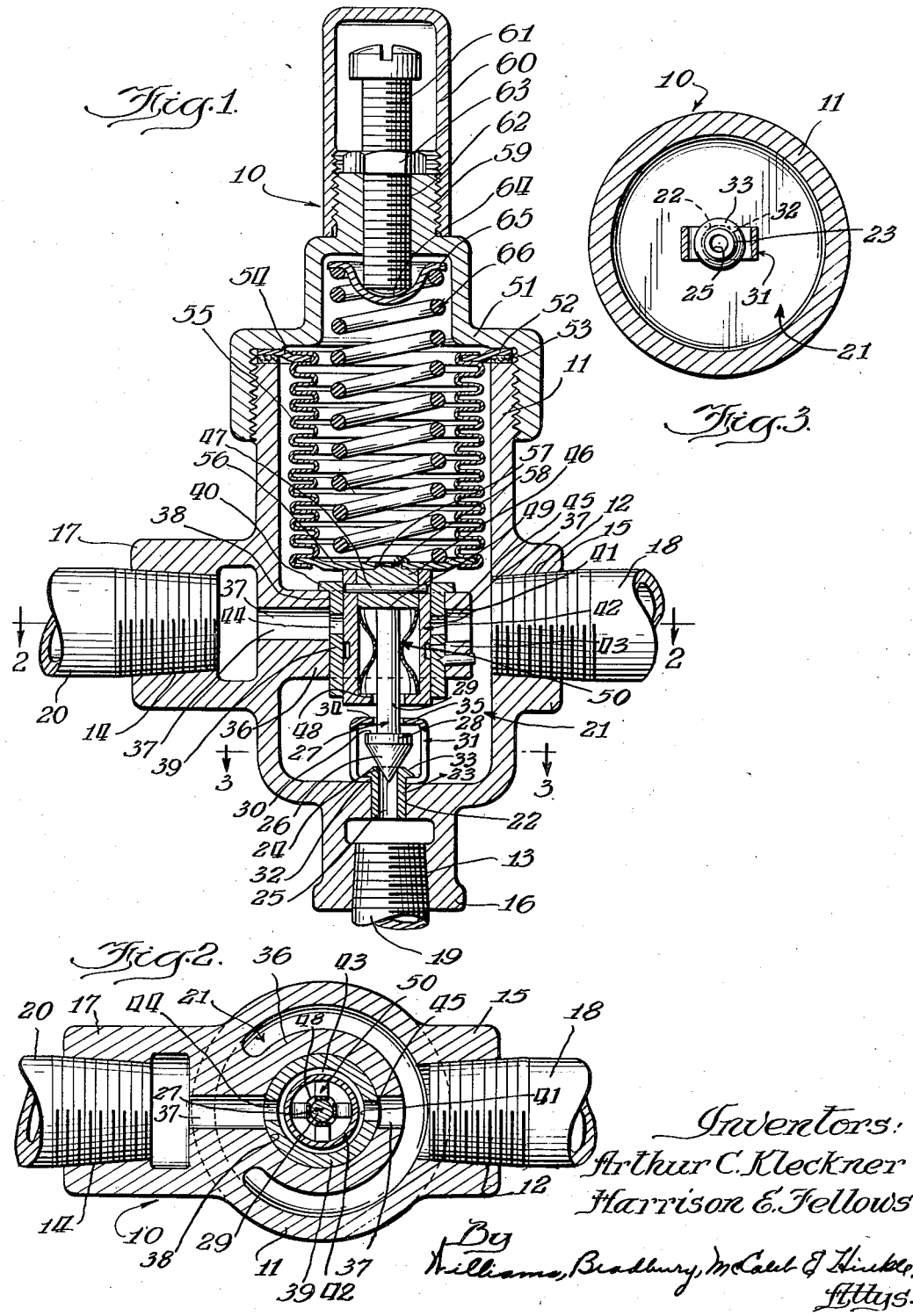
Inventors:
Arthur C. Kleckner
Harrison E. Fellows
By
Williams, Bradbury, McCaleb & Hinkle
Attys.

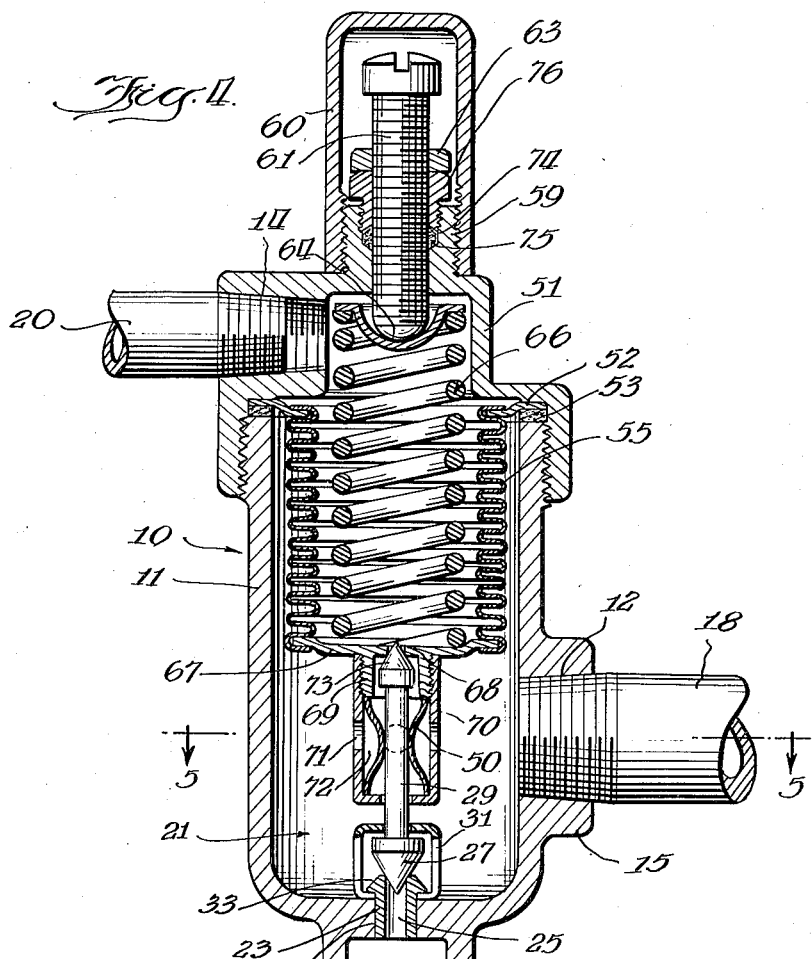

Patented Apr. 30, 1935

1,999,697

UNITED STATES PATENT OFFICE 1,999,697

PRESSURE RESPONSIVE VALVE

Arthur C. Kleckner and Harrison E. Fellows, Racine, Wis., assignors to Webster Electric Company, Racine, Wis., a corporation of Wisconsin Application April 11, 1933, Serial No. 665,539

8 Claims. (Cl. 137—153)

The present invention relates to pressure responsive valves and has as one of its primary objects to simplify, render more efficient, and improve devices of this character. The invention, while capable of many and diversified uses, finds particular utility when used in connection with oil burners for automatically maintaining a constant pressure on the fuel supplied to the burner and for completely stopping this flow at all times when the pressure is below a predetermined desirable operating pressure.

Another object of the invention is the provision of an improved pressure responsive valve for oil burner systems capable of promptly stopping the flow of oil and pressure as soon as the fan which supplies air is stopped, by means of a novel sequence in the operation of the various elements of the pressure responsive valve.

With the oil burner pressure regulating valves of the prior art, the pressure regulating valve is adapted to shut off the fuel oil under pressure when the oil pump stops and the pressure of the oil diminishes. However, it requires an appreciable length of time for the pressure regulating valves of the prior art to act, and undesirable operating characteristics are caused by the failure of the valve to act soon enough in shutting off the flow of oil to the nozzle.

The sequence of operation of the elements of an exemplary oil pressure regulator valve of the prior art will now be described for the purpose of showing the undesirable characteristics which are eliminated by means of the present invention.

When the motor is shut off, the pump, which generates the pressure in the oil, stops, as it is driven by the motor, and the fan, which supplies the air to the burner, also stops quite promptly. These rotating elements coast to a position of rest, depending upon the damping action of the fan and the stronger damping action of the pump and the momentum which the rotating parts have. Due to the damping action of the pump, the motor, fan and pump would stop quite quickly.

Where the pressure regulating valve is provided with a by-pass for conducting excess liquid fuel back to the tank, this release of the pressure back to the tank would permit the pressure to diminish in the pressure chamber of the regulating valve quite quickly after the pump stops, and the diaphragm or bellows would close the by-pass valve quite soon after the pump stops. However, it usually requires an appreciable time before the pressure drops in the pressure chamber of the regulating valve to such a point that the outlet valve to the nozzle is closed, and during this time when the air supply has been shut down but the oil supply is still continuing, combustion goes on at the burner nozzle with a reduced supply of oxygen.

This delivery of oil after the blower has been stopped causes imperfect combustion, carbonization of the adjacent parts, and a puffing noise in the furnace due to the lack of air. This puffing of the furnace during the shutting off of the burner can sometimes be heard in parts of the building remote from the furnace; it is very annoying to the occupants, and it is an undesirable operating characteristic, which it is the object of this invention to eliminate.

One object of the invention is the provision of an improved pressure responsive valve which is adapted to close the output valve or needle valve to the nozzle during the initial movement of the pressure responsive bellows beyond a predetermined amount after the pump has been shut down; in other words, it is an object to provide a valve in which the output valve is first opened and then the by-pass valve, and in which on the closing operation the output valve is first closed and then the by-pass valve closed.

Another object of the invention is the provision of an improved regulator valve by means of which the delivery of oil after the blower has stopped is eliminated or minimized so as to eliminate combustion in the furnace at that time when there would be a lack of oxygen to support the combustion properly.

Another object is the provision of a plurality of improved forms of pressure responsive valves of this type which are distinguished by their simplicity of operation and construction and which insure a supply of fuel to the burner under a constant predetermined pressure, but which cut off the supply of fuel to the burner as soon as possible when the burner is to be shut down.

Referring to the drawings, of which there are two sheets,

Fig. 1 is a vertical sectional view taken upon a plane passing through the axis of the substantially cylindrical valve casing, showing the details of construction of one pressure responsive valve constructed according to the present invention.

Fig. 2 is a horizontal sectional view taken on the plane of the line 2—2 of Fig. 1, looking in the direction of the arrows.

Fig. 3 is a horizontal sectional view taken on the plane of the line 3—3 of Fig. 1, looking in the direction of the arrows.

Fig. 4 is a view similar to Fig. 1 of a modification showing the embodiment of the invention in a valve of the type having the by-pass through the pressure responsive bellows.

Fig. 5 is a sectional view taken on the plane of the line 5—5 of Fig. 4, looking in the direction of the arrows.

Referring to Figs. 1 to 3 of the drawings, 10 indicates in its entirety the pressure responsive valve, which preferably comprises a metal casing 11 having the inlet 12, burner outlet 13, and by-pass outlet 14. The casing 11 is preferably substantially cylindrical in shape, but may assume various forms capable of accomplishing the results described herein, and in some cases may be incorporated in a combined valve strainer and pump unit, with strainers of the type shown in the prior application of Harrison E. Fellows, Serial No. 603,734, filed April 7, 1932, and pumps of the type shown in the prior application of Arthur C. Kleckner, Serial No. 604,834, filed April 12, 1932.

The cylindrical casing is preferably provided with outwardly projecting bosses 15, 16, 17 having bores 12, 13 and 14 which are provided with pipe threads for receiving the conduit pipes 18, 19 and 20, which lead from a pump, to a nozzle, and back to a tank respectively.

The inlet conduit 12 preferably leads to the interior of the valve casing 11 communicating with the pressure chamber 21, and the nozzle outlet 13 also preferably communicates directly with the pressure chamber 21.

The bore 13 preferably leads to a smaller bore 22, which has a pressed or threaded fit with a sleeve 23 which is formed with a valve seat 24 and provided with a bore 25 communicating with the bore 13. The valve seat 24 is adapted to co-operate with a substantially conical point 26 on a needle valve 27. The needle valve is provided with a head 28 and with a stem 29 of reduced size, thereby forming an annular shoulder 30 above the head, which is adapted to serve as a stop.

A stirrup 31 may consist of a strip of metal bent to substantially rectangular shape, as shown, and the stirrup is provided with a bore 32 for passing the sleeve 23. Sleeve 23 may have a head 33, and the lower yoke of stirrup 31 may be confined between head 33 and the inside wall of casing 11. At its upper side the stirrup 31 may be also provided with a bore 34, or it may have the opposite ends of the stirrup directed inwardly toward each other above the annular shoulder 30 on the head of the needle valve 27. Thus the stop flanges 35 of stirrup 31 are adapted to limit the upward movement of the needle valve 27 and hold it in the same position to prevent its further opening while the other parts of the mechanism may continue to move upward.

The casing 11 is preferably provided with an inwardly extending boss 36 having a conduit 37 which communicates with the by-pass conduit 14. The boss 36 may be of substantially partially circular shape in plan, as shown in Fig. 2, and provided wtih a flat top and a flat bottom. A transverse bore 38 extends through the boss 36 from the top to the bottom, communicating with the conduit 37, and the bore 38 may be lined by an accurately machined metal sleeve 39 of suitable metal such as brass, bronze or other alloys capable of serving as a part of a piston valve.

Sleeve 39 may be a pressed frictional fit in the bore 38 or it may be screw-threaded therein, and its final position is determined by engagement of the annular flange 40 on the sleeve 39 with the top of the lug 36. A cylindrical bore 41 extends through sleeve 39 from the top to the bottom.

Slidably mounted in the bore 41 is the piston valve, indicated in its entirety by the numeral 42. This piston valve may consist of a substantially cylindrical metal member constructed of a suitable alloy for a piston valve and provided with an annular groove 43 extending about its periphery in a horizontal plane, in Fig. 1, in such manner that the annular groove establishes communication between the left hand part of the conduit 37 and the right hand part of the conduit 38, by means of bores 44 and 45 in sleeve 39.

It should be noted that the sleeve 39 is provided with bores 44, 45 communicating with the conduit 37 and forming a continuation thereof. When the groove 43 is in registry with the bores 44, 45, fluid under pressure may pass in at the right hand part of the conduit 37 through the bore 45 and groove 43, through the bore 44 and conduit 37, to the by-pass outlet 14.

When the piston valve is in the position shown in Fig. 1, however, the cylindrical wall of the piston valve 42 closes the outlet by-pass conduit 37 at the bores 44, 45.

The piston valve 42 is preferably hollow, and clyindrical in form, the open upper end being closed by a rivet plug 46, which may be secured therein by a close frictional fit and also by means of a transverse metal pin 47 which passes through the plug 46 and into the walls of the piston valve 42. The lower end of the piston valve may be provided with a centrally located bore 48, which is preferably slightly larger in size than the stem 29 of the needle valve 27 so as to guide the needle valve, but not to interfere with its proper seating.

It should be noted that the stem 29 of the needle valve is separated from the plug 46 at the point 49 so that the piston 42 and plug 46 may move upward after the needle valve 27 has been stopped by engagement of the shoulder 30 with flanges 35.

The stem 29 of the needle valve 27 is preferably substantially cylindrical, and it is slidably and frictionally mounted in the piston valve 42 by means of a plurality of springs 50 or other friction device capable of interposing a predetermined amount of resistance to relative movement between the needle valve and the piston valve.

Various types of frictional devices or lost motion devices or fluid pressure arrangements for accomplishing this result may be employed and are substantially equivalent to the springs illustrated. For example, each of the springs 43 may consist of resilient sheet metal members having their ends engaging the cylindrical wall of the interior of the piston 42 and having their midpoints engaging the stem 29 of needle valve 27 at regularly spaced points about its periphery.

The springs 50 grip the stem 29 and tend to cause it to move with the piston valve, but when the stop flanges 35 engage the head 28 of the needle valve, the movement of the needle valve is stopped and the springs permit the piston to continue its motion upward. On the return motion of the piston, however, the needle valve 27 is immediately caused to move downward so that during the initial movement of the piston downward the needle valve moves toward closed position, and if this initial movement is continued far enough the needle valve is closed.

A suitable range of movement is provided between the annular shoulder 30 and the stop flanges 35 so that the needle valve would not be closed due to minute flutterings or variations in the fluid pressure, but the needle valve would be promptly closed, since the pressure in the chamber 21 diminishes substantially below a predetermined amount, such as would take place when the pump is shut down.

The upper part of the casing 11 is preferably provided with an open end which may be closed by a cover or cap 51. Casing 11 and cap 51 are provided with complementary threads, and the cap 51 is adapted to clamp against the flat upper end of the casing, supporting plate 52, and a fluid-tight gasket 53.

The annular supporting plate 52 preferably is offset at 54 and at its inner circular edge it may support one end of a pressure responsive flexible bellows. The annular supporting member 52 is clamped between the uppermost folds of the bellows 55, and the joint is suitably welded or soldered to provide a fluid-tight joint.

The bellows is also provided with an end plate 56 at the opposite end, of substantially circular shape, also clamped between the lowermost folds of the bellows and suitably soldered, welded, or otherwise secured to form a fluid-tight joint.

The end plate 56 has an aperture 57 through which a lug 58, carried by plug 46, passes, and the lug 58 is riveted over to fixedly secure the lug 46 and piston 42 to the end of the bellows.

Various types of pressure responsive diaphragms may be used, but the bellows type of diaphragm is preferably employed on account of the greater range of movement provided by this type of diaphragm and the certainty of operation of such a structure.

Operative embodiments of the invention may also be made by employing a pressure responsive piston slidably mounted in the upper end of the casing 11 and having the outer face of the piston open to external pressure, so that the piston may replace the diaphragm. Such pistons are, however, subject to the disadvantage that they are apt to stick and get out of order due to the leakage of the liquid past the piston and the deposit of particles of dirt between the wall of the piston and that of the cylinder, and it is preferable to employ the bellows type of diaphragm illustrated.

The upper end of the cap or cover 51 is preferably provided with a threaded lug 59 which is adapted to receive a cap 60 for sealing the pressure adjustment screw bolt 61. The lug 59 has an internally threaded bore 62 for receiving the bolt 61 which is secured in place by a lock nut 63. At its inner end the bolt 61 engages a sheet metal member which is formed with a socket 64 for receiving the inner end of the bolt and with an annular seat 65 for supporting the end of a helical coil spring 66.

The coil spring 66 is under a suitable initial pressure and is compressed between the end plate 56 and the plate 64, which is, of course, supported by the casing 11.

The amount of pressure of the spring 66 tending to move the diaphragm or bellows 55 downward may be regulated by means of the screw bolt 61 and the bolt 61 is thus adapted to predetermine the pressure at which the pressure responsive valves will be actuated.

The operation of this embodiment of the invention is as follows: When the pump is started and the oil pressure is generated thereby, oil under pressure is conducted to the pressure chamber 21 through the inlet conduit 12, and as soon as the pressure in the chamber 21 reaches a predetermined amount, the oil under pressure causes the bellows diaphragm 55 to collapse. The oil under pressure reacts against the natural resiliency of the diaphragm or bellows and also against the pressure of the spring 66 and causes the bellows 55 to move upward, carrying with it piston valve 42 and needle valve 27.

The needle valve 27 first opens the port 25, but after the shoulder 30 on the needle valve engages flange 35 the needle valve does not move any farther away from its seat 24.

The nozzle is then supplied with oil under pressure, and as the pressure in the chamber 21 still continues to increase the piston 42 is moved upward by the bellows 55, until groove 43 is in registry with bores 44, 45 and any excess of liquid under pressure is thus by-passed through the conduits 37, 14 and 20 back to the tank and the oil pressure at the nozzle is constantly maintained within predetermined pressure limits.

When the pump motor is shut down, the motor being stopped by disconnection of the electrical current supply, the pump stops, and as soon as the pump stops the excess liquid fuel under pressure passes out of the pressure chamber 21 of the valve through the by-pass conduit 14.

The pressure in the chamber 21 then diminishes and the bellows 55 tends to move downward under the influence of spring 66, which is not resisted to the same extent by the diminished fluid pressure in the chamber 21.

When the piston moves upward, the springs 50 permit a sliding movement between the piston 42 and stem 29, due to the fact that the stop 35 prevents further movement and the positive resistance of the stop 35 overcomes the lesser resistance of the friction between the stem 29 and springs 50.

As soon as the piston 42 starts to move downward, in Fig. 1, the needle valve 27, which is gripped by the springs 50, moves with the piston 42 and tends to close the needle valve 25 first. When the needle valve has moved far enough to effect a closure of the port 25, then it can move no farther and the positive resistance of the valve seat 24 against the needle valve 27 overcomes the frictional resistance of the gripping springs 50, and the stem 29 slides between the springs 50 as the piston continues to move downward. The piston valve next closes the by-pass port, and when the piston valve again reaches the position of Fig. 1, the needle valve 27 is positively held shut by means of the spring pressure 66 and engagement of the end of the stem 29 with the plug 46.

The needle valve or piston valve may be provided with suitable leakage grooves or other leakage means for permitting leakage after initial closure, if desired, to reduce the pressure in chamber 21. However, the piston valve is inherently capable of permitting sufficient leakage after closure to permit this desirable reduction in pressure in the chamber 21 after the valves are closed and thus assure a better seating of the needle valve by means of the spring 66.

It will thus be observed that by means of the friction device 50 or the lost motion connection between the needle valve and the piston valve, the sequence of operation of these two valves is changed, the needle valve being opened first and closed first, and the piston valve being opened last and closed last.

Referring to Figs. 4 and 5, this is a modification in which the by-pass port 14 has been located in another part of the device, communicating through the cap 51 with the interior of the bellows 55.

In this embodiment the end plate 67 of the bellows is provided with a centrally located aperture 68 forming a valve opening and a valve seat. End plate 67 may support a threaded sleeve 69 which is adapted to support an internally threaded tubular casing 70. The casing 70 forms a support and guide for the springs 50, as in the preceding embodiment, and while it does not act as a piston, the details of support of the needle valve 27 by means of the springs 50 may be exactly as described in the preceding embodiment.

Sleeve 70 is provided with apertures 71, providing communication between the space 72 inside the sleeve and the pressure chamber 21. The stem 29 of needle valve 27 supports a second needle valve 73 of similar construction at its opposite end for cooperation with the port 68. Needle valve 73 is the by-pass valve.

The operation of this embodiment is as follows: When the bellows 55 first moves upward it carries with it, by virtue of the gripping action of the springs on the stem 29, both of the needle valves 27 and 73. Port 68 being closed, it remains closed at this time, but needle valve 27 opens the port 25 as in the previous embodiment.

When the shoulder 30 engages stirrup 31, further movement of the stem 29 and valves 27, 73 is prevented, and a slipping action takes place between the springs 50 and the stem 29. The continued upward movement of the bellows 55 and end plate 67 effectively moves the seat of the by-pass port valve 68 away from the needle valve 73 and opens the by-pass port. Excess liquid under pressure is by-passed through openings 71, chamber 72, port 68, bellows 55, and by-pass port 14 back to the tank.

All of the other details of construction of this modification may be substantially as described with respect to Figs. 1 to 3, and similar characters of reference have been applied to those similar parts, with the following exception: The interior of the cap 51 is subjected to fluid under pressure and there might be leakage past a screw bolt 61. Therefore, the sleeve 59 is counterbored at 74, provided with a packing 75 and a gland 76 below the lock nut 63 to prevent any such leakage.

In both of these embodiments it will be noted that the needle valve is resiliently supported by the springs and permitted to become self-aligning with respect to the frusto-conical valve seats with which the needle valves engage. This resilient frictional support enables the needle valves to seat more perfectly and thus assures a better closure, as well as effecting a change in the sequence of the operation of the valves over the prior art.

When pressure responsive valves constructed according to the present invention are employed, the valve outlet to the nozzle is closed quite promptly after the pump is shut down and there is no dribbling of the oil out of the nozzle under reduced pressure nor any continued supply of oil after the blower has ceased operating.

The imperfect combustion and resulting carbonization, and the puffing noise which result from lack of air in the devices of the prior art are eliminated by the use of this improved pressure responsive valve, and the operating characteristics of the system are greatly improved.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim is new and desire to secure by Letters Patent of the United States, is:

1. In a pressure responsive valve for oil burners, the combination of a casing provided with a pressure chamber and with inlet, outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows being arranged so that either valve means may be actuated without actuating the other valve means throughout a predetermined range, said lost motion means comprising a sliding frictional engagement between one of said valve means and a part carried by said bellows, and stop means for preventing further movement of one of said valve means and causing sliding at the point of frictional engagement.

2. In a pressure responsive valve for oil burners, the combination of a casing provided with a pressure chamber and with inlet, outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows being arranged so that either valve means may be actuated without actuating the other valve means throughout a predetermined range, one of said valve means comprising a piston valve carried by said bellows and the other of said valve means comprising a needle valve slidably mounted in said piston valve.

3. In a pressure responsive valve for oil burners, the combination of a casing provided with a pressure chamber and with inlet, outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows whereby either valve means may be actuated without actuating the other valve means throughout a predetermined range, one of said valve means comprising a piston valve carried by said bellows and the other of said valve means comprising a needle valve slidably mounted in said piston valve, said piston valve controlling said by-pass port and said needle valve controlling said outlet port.

4. In a pressure responsive valve for oil burners, the combination of a casing provided with a pressure chamber and with inlet, outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows being arranged so that either valve means may be actuated without actuating the other valve means throughout a predetermined range, one of said valve means comprising a piston valve carried by said bellows and the other of said valve means comprising a needle valve slidably mounted in said piston valve, said piston being provided with a plurality of resilient members frictionally engaging the stem of said needle valve.

5. In a pressure responsive valve for oil burners, the combination of a casing provided with a pressure chamber and with inlet, outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows being arranged so that either valve means may be actuated without actuating the other valve means throughout a predetermined range, one of said valve means comprising a piston valve carried by said bellows and the other of said valve means comprising a needle valve slidably mounted in said piston valve, said piston being provided with a plurality of resilient members frictionally engaging the stem of said needle valve, and said casing being provided with stop means for engaging a stop surface on said needle valve to limit the range of movement of said needle valve from its seat.

6. In an oil regulator valve, the combination of a pressure chamber having inlet, outlet and by-pass ports, with valves for controlling said outlet port and said by-pass port, diaphragm controlled by the pressure in said chamber for actuating said valves, the outlet valve being actuated by the initial movement of said diaphragm to open position, and the by-pass valve being actuated by subsequent movement of said diaphragm, to open position, and a lost motion connection between said outlet valve and said diaphragm whereby said outlet valve slides with respect to said diaphragm upon said subsequent movement, and said by-pass valve is closed on reverse movement of the diaphragm subsequent to the closing of said outlet valve.

7. In a pressure responsive valve, the combination of a casing provided with inlet, outlet and by-pass ports, valve means for controlling said outlet port, valve means for controlling said by-pass port, pressure responsive means for actuating said valves, and lost motion connecting means between one of said valve means and said pressure responsive means whereby the pressure responsive means operates to open the outlet port first at a predetermined pressure and subsequently to open the by-pass port at a predetermined pressure, and upon closing movement to close said outlet port first and subsequently to close said by-pass port upon a predetermined reduction in pressure.

8. In a pressure responsive valve, the combination of a casing provided with inlet, outlet and by-pass ports, valve means for controlling said outlet port, pressure responsive means for actuating said valves, and operative mechanical connecting means between one of said valve means and said pressure responsive means whereby the pressure responsive means operates to open the outlet port first at a predetermined pressure and subsequently to open the by-pass port at a predetermined pressure, and upon closing movement to close said outlet port first and subsequently to close said by-pass port upon a predetermined reduction in pressure, said operative mechanical connecting means comprising a sliding frictional connection between said pressure responsive means and one of said valve means.

ARTHUR C. KLECKNER.
HARRISON E. FELLOWS